United States Patent

Sprinzak

[15] 3,700,720
[45] Oct. 24, 1972

[54] PROCESS FOR THE PRODUCTION OF HALOGENATED BENZILIC ACID ALKYL ESTERS

[72] Inventor: Yaïr Sprinzak, Rehovoth, Israel

[73] Assignee: Yeda Research and Development Co., Ltd., Rehovoth, Israel

[22] Filed: Oct. 20, 1969

[21] Appl. No.: 867,890

[30] Foreign Application Priority Data

Oct. 21, 1968 Israel..........................30 923

[52] U.S. Cl. ............................................260/473 A
[51] Int. Cl..............................................C07c 69/76
[58] Field of Search.........................260/520, 473 A

[56] References Cited

OTHER PUBLICATIONS

Y. Sprinzak et al. J. Am. Chem. Soc., 85, 1655 (1963).
Bemis et al., J. Am. Chem. Soc., 88 5491 (1966).
Fiesen et al., " Organic Chemistry," Rheinhold Publishing Corp. N.Y. (1956), page 228.
Sprinzak, J. Am. Chem. Soc. 80 5449 (1958).

*Primary Examiner*—Lewis Gotts
*Assistant Examiner*—John F. Terapane
*Attorney*—Ostralenk, Faber, Gerb & Soffen

[57] ABSTRACT

Halogenated benzilic acid alkyl esters are prepared by oxidizing the corresponding halogenated diphenylacetic acid alkyl ester in a polar-aprotic solvent in the presence of a quaternary ammonium hydroxide.

13 Claims, No Drawings

PROCESS FOR THE PRODUCTION OF HALOGENATED BENZILIC ACID ALKYL ESTERS

The present invention relates to a new process for the preparation of halogenated benzilic acid alkyl esters, especially for the preparation of 4,4'-dibromobenzilic acid alkyl esters.

Alkyl 4,4'-dichloro-, 4-chloro-4'-bromo- and 4,4'dibromobenzilates are known agents for killing insects and acarinae.

The processes utilized up to now for the preparation of halogenated benzilic acid alkyl esters having not been found to be satisfactory. Usually they require several steps of reaction which makes them expensive, cumbersome and reduces the yield. Moreover, the products obtained are not always very pure (Berichte 41, 56 (1908); Belgian Pat. No. 691105).

It is also known from the J.Am.Chem.Soc. 85, 1656 (1963) that on oxidizing diphenyl acetic acid methyl ester at room temperature by means of oxygen in pyridine and in the presence of benzyltrimethylammonium hydroxide, a mixture consisting of about 42 percent of diphenyl hydroperoxyacetic acid methyl ester or benzilic acid (after the acidification), about 26 percent of benzophenone and about 5 percent of benzilic acid methyl ester is obtained. It has now been found that the low yields of the desired benzilic acid ester are due to a too low concentration of the solution (about 7.5 percent) and to a too high concentration of the benzyltrimethylammonium hydroxide (120 mole percent) which conditions favor the formation of the undesired diphenyl hydroperoxyacetic acid methyl ester and benzophenone.

It is thus the object of the present invention to develop a process for the preparation of halogenated benzilic acid alkyl esters, which gives exceptionally high yields and very pure end-products.

The process according to the present invention for the preparation of halogenated benzilic acid alkyl esters of the general formula I

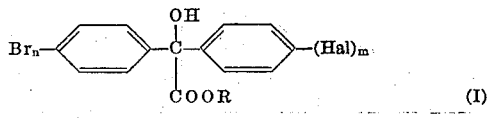

wherein
R represents alkyl having from 1 to 4 carbon atoms,
Hal represents chlorine or bromine, and
n and m represent 0 or 1
comprises passing continuously oxygen or a gaseous mixture containing oxygen, in particular air, while stirring, through a 10 to 50 percent by weight solution of a corresponding diphenylacetic acid alkyl ester in a polar-aprotic solvent at temperatures ranging between −10° and 30° C and in the presence of at most 10 mole-percent, calculated on said acetic acid ester, of a quaternary ammonium hydroxide of the general formula II

wherein
$R_1$ and $R_2$ represent lower alkyl, and
$R_3$ and $R_4$ independently represent lower alkyl, phenyl, benzyl or piperidyl
and separating the benzilic acid alkyl ester, obtained from the oxidation of the diphenylacetic acid alkyl ester, from the reaction mixture.

As lower alkyl $R_1$ to $R_4$ are meant alkyl radical having one to four, preferably one or two carbon atoms.

The oxidation is preferably performed at temperatures ranging from 0° to 25° C. When oxygen is used the temperature should be kept rather low, e.g. about 0° C, whereas when air is used the preferred temperature lies at about 25° C.

As quaternary ammonium hydroxide of formula II can be mentioned, for example, tetramethylammonium hydroxide, benzyltrimethylammonium hydroxide, benzyltriethylammonium hydroxide and phenyltrimethylammonium hydroxide; tetramethylammonium hydroxide being preferred. The quaternary ammonium hydroxide must be used in amounts of less than 10 mole-percent, calculated on the molecular amount of the starting ester, the addition being made continuously or in portions. As solvents, polar-aprotic solvents, i.e. those which do not furnish protons, can be mentioned, for instance pyridine, 2,4,6-trimethyl pyridine, α-picoline and dialkylformamides, preferably dimethylformamide. The preferred concentration of the starting ester in the polar solvent ranges between 15 and 30 percent by weight.

The oxidation may be preferably performed with pure oxygen or with air. When air is used as oxidation means, the preferred rate of introducing the air during the oxidation is at least 4 liters of air per mole of diphenyl acetic acid ester and per minute. More than 12 liters of air per mole and minute no longer influence the yield of the resultant benzilic acid ester. When 4 liters of air per mole and minute are used at about 25° C, the reaction times vary between 30 minutes and 60 minutes depending on the stirring speed, e.g. of about 2,000 r.p.m. If 12 liters of air/mole/minute are used, the reaction time can be reduced to a value varying between 15 to 30 minutes depending on the stirring speed. If less than 4 liters air/mole/minute are used, considerably lower yields are obtained.

When air at a rate of at least 4 liters/mole/minute is employed, the quaternary ammonium hydroxides of formula II are preferably used in an amount ranging between 1 and 3 mole-percent calculated on the molar amount of the starting diphenyl acetic acid ester. When pure oxygen is used, the velocity may be greatly reduced, e.g. to a minimum of 0.25 liters oxygen/mole/minute at 0° C. Here also an amount of 1 to 3 mole-percent of quaternary ammonium hydroxide is sufficient for obtaining very high yields of the end-products. When using oxygen at about 0° C, the necessary time for completing the reaction is 45 to 60 minutes, and the stirring speed may be much lower, e.g. 500 r.p.m.

The starting materials used in the new process, i.e. the halogenated diphenylacetic acid alkyl esters and their preparation are known.

If desired, the benzilic acid alkyl esters obtained can be hydrolized into the corresponding benzilic acids in a known manner, e.g. by boiling the ester with an aqueous-alcoholic solution of potassium hydroxide, thus yielding the potassium salt, which salt is then treated with a mineral acid, e.g. sulfuric acid.

The following examples illustrate the invention. The temperatures are in degrees Centigrade.

EXAMPLE 1

A solution of 7.68 g (0.02 mole) of methyl bis-4-bromophenylacetate in 32 ml of pyridine (concentration 19.7 percent by weight) was stirred and at the same time oxygen was passed through the solution at a rate of 5–6 ml of oxygen per minute at 0°. To the solution was added in the course of about 1 hour, 0.5 ml of a 25 percent aqueous solution of tetramethylammonium hydroxide (6.8 mole-percent). After this time 250 ml of oxygen (measured at room temperature and normal pressure) had been absorbed, the reaction flask was flushed with nitrogen and the temperature of the reaction mixture was brought to 25° in the course of about 20 minutes. The solvent was then distilled off at reduced pressure, water was added and distilled off to remove any residual solvent. Fresh water was then added and the mixture was stirred at room temperature, whereupon the product crystallized. The crystals were filtered off, washed with water and dried. There were obtained 7.78 g of methyl-4,4′-dibromobenzilate, m.p. 65°–69°. After recrystallization from isopropanol, the melting point was 74.5°–75.5° (97.2 percent).

EXAMPLE 2

The reaction was performed as in Example 1, replacing the methyl bis-4-bromophenylacetate by 7.95 g (0.02 mole) of ethyl bis-4-bromophenylacetate. After removal of the solvent as described in Example 1, the oily product was diluted with benzene, the benzene solution was washed successively with water, diluted hydrochloric acid and water. Finally, the benzene was distilled off, first at normal pressure and then at reduced pressure. There were obtained 7.90 g of ethyl-4,4′-dibromobenzilate in the form of a thick oil, b.p. 169°/0.065 Torr (95.4 percent).

EXAMPLE 3

The reaction was performed as in Example 1, replacing the methyl bis-4-bromophenylacetate by 103 g (0.25 mole) of isopropyl bis-4-bromophenylacetate in 300 ml pyridine. There were obtained 103 g of isopropyl 4,4′-dibromobenzilate, melting point 73°–76°. After recrystallization from petroleum ether the melting point was 79°–80° (96.2 percent).

EXAMPLE 4

The reaction was carried out as in Example 1, replacing the methyl bis-4-bromophenylacetate by 8.52 g (0.02 mole) of sec-butyl bis-4-bromophenylacetate, and utilizing as solvent, 32 ml of dimethylformamide and as catalyst, 0.5 ml of a 40 percent aqueous solution of benzyltrimethylammonium hydroxide. There were obtained 8.24 g of sec-butyl 4,4′-dibromobenzilate, melting point 73°–74.5°. After recrystallization from petroleum ether, the melting point was 75°–76° (93.2 percent).

EXAMPLE 5

The reaction was performed as in Example 3, except that α-picoline was used as solvent. There were obtained 103 g of isopropyl 4,4′-dibromobenzilate, melting point 73°–76° (96.2 percent).

EXAMPLE 6

A solution of 273 g (0.66 mole) of isopropyl bis-4-bromophenyl-acetate in 1,000 g of dimethylformamide was stirred (500 r.p.m.) at 0° C. Oxygen was bubbled through this solution at a rate of 266 ml of $O_2$ per mole of starting acetate and per minute, for 45 minutes. 26 ml of a 10 percent aqueous solution of tetramethylammonium hydroxide (2.4 mole-percent) were added in three portions (11 ml at the beginning, 11 ml after 22 minutes and 4 ml towards the end of the reaction time) to the solution, the temperature being always kept at 0° C by cooling. The resulting solution was treated as described in Example 1. In this manner 256 g (90 percent) of isopropyl 4,4′-dibromobenzilate (melting point 79°–80°) were obtained.

EXAMPLE 7

A solution of 103 g (0.25 mole) of isopropyl bis 4-bromophenylacetate in 400 ml of dimethylformamide was stirred vigorously (2,000 r.p.m.) at 25° C. Air was bubbled through this solution at a rate of 2 to 3 liters per minute (8 to 12 liters per mole and minute) and at the same time 3.5 ml of a 10 percent aqueous solution of tetramethylammonium hydroxide were added dropwise to the solution, during a period of 18 to 20 minutes. This corresponds to a total amount of 1.5 mole-percent, calculated on the amount of the starting ester (0.25 mole). After the addition of the tetramethylammonium hydroxide was completed, the reaction mixture was stirred for another 5 minutes during which period the introduction of air was continued. During the whole reaction, the temperature was maintained between 22° and 25° by gentle cooling. The solvent was then distilled off at reduced pressure and the end-product was recovered as described in the procedure of Example 1, whereby 104 g (97 percent of the theory) of pure isopropyl 4,4′-dibromobenzilate, melting point 79°–80° C, were obtained.

Similarly, the following compounds were prepared:
n-butyl 4,4′-dibromobenzilate b.p. 170°/0.006 Torr
isobutyl 4,4′-dibromobenzilate m.p. 74°–75°
methyl 4-bromo-4′-chlorobenzilate m.p. 61°–63°
ethyl 4-bromo-4′-chlorobenzilate b.p. 165°–167°/0.005 Torr
n-propyl 4-bromo-4′-chlorobenzilate b.p. 170°–175°/0.001 Torr
isopropyl 4-bromo-4′-chlorobenzilate m.p. 64°–70°
n-butyl 4-bromo-4′-chlorobenzilate b.p. 187°–190°/0.001 Torr
sec-butyl 4-bromo-4′-chlorobenzilate m.p. 55°–56°
isobutyl 4-bromo-4′-chlorobenzilate m.p. 66°–67°

What I claim is:

1. Process for the production of halogenated benzilic acid alkyl esters of Formula I

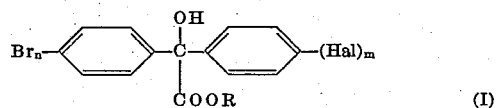

(I)

wherein
R represents alkyl having from one to four carbon atoms, and
Hal represents chlorine or bromine, and
which comprises passing continuously oxygen or a gaseous mixture containing oxygen, while stirring, through a 10 to 50 percent by weight solution of a corresponding halogenated diphenylacetic acid alkyl ester in a polar-aprotic solvent at temperatures ranging between −10° and 30° C and adding continuously or in portions, at most 10 mole-percent, calculated on said acetic acid ester of a quaternary ammonium hydroxide of Formula II

(II)

wherein
 $R_1$ and $R_2$ represent lower alkyl, and
 $R_3$ and $R_4$ independently represent lower alkyl, phenyl, benzyl or piperidyl,
 and separating the benzilic acid alkyl ester, obtained from the oxidation of the halogenated diphenylacetic acid alkyl ester, from the reaction mixture.

2. Process according to claim 1, which comprises conducting the oxidation in a 15 to 30 percent by weight solution of the halogenated diphenylacetic acid ester in a polar-aprotic solvent.

3. Process according to claim 1, which comprises using dimethyl-formamide, diethyl-formamide, α-picoline, pyridine or 2,4,6-trimethyl-pyridine as polar-aprotic solvent.

4. Process according to claim 1, which comprises performing the oxidation by means of air as gaseous mixture containing oxygen at a temperature ranging between 15° and 25° C.

5. Process according to claim 1, which comprises performing the oxidation by means of oxygen at a temperature of about 0° C.

6. Process according to claim 1, which comprises using a tetraalkylammonium hydroxide as quaternary ammonium hydroxide of Formula II.

7. Process according to claim 6, which comprises using tetramethylammonium hydroxide.

8. Process according to claim 1, which comprises using a trialkylbenzylammonium hydroxide or a trialkylphenylammonium hydroxide as quaternary ammonium hydroxide of Formula II.

9. Process according to claim 8, which comprises using trimethylbenzylammonium hydroxide or trimethylphenylammonium hydroxide.

10. Process according to claim 1, which comprises maintaining, by the oxidation with air, an air velocity of at least 4 liters of air per mole of halogenated diphenylacetic ester and per minute.

11. Process according to claim 1, which comprises performing the oxidation in the presence of 1 to 3 mole-percent of the quaternary ammonium hydroxide, calculated on the halogenated diphenylacetic ester.

12. Process according to claim 1, which comprises maintaining, by the oxidation with oxygen, an oxygen velocity of at least 0.25 liters of oxygen per mole of halogenated diphenylacetic acid and per minute.

13. Process according to claim 1, which comprises using a bis-(4-bromophenyl)-acetic acid alkyl ester as starting compound.

* * * * *